United States Patent [19]
Lundström

[11] 3,857,083
[45] Dec. 24, 1974

[54] CONVERTOR EQUIPMENT COMPRISING A PLURALITY OF SINGLE-PHASE CONVERTOR BRIDGES

[75] Inventor: Harry Lundström, Vasteras, Sweden

[73] Assignee: Allmanna Svenska Elektriska Aktiebolaget, Vasteras, Sweden

[22] Filed: Jan. 25, 1974

[21] Appl. No.: 436,619

[30] Foreign Application Priority Data
Feb. 2, 1973   Sweden............................ 73014326

[52] U.S. Cl.............. 321/14, 317/33 SC, 317/40 A, 321/27 R
[51] Int. Cl.............................................. H02h 7/14
[58] Field of Search.......................... 321/11–14, 321/27 R; 317/40 A, 33 SC

[56] References Cited
UNITED STATES PATENTS
3,017,558   1/1962   Kozacka.............................. 321/14

Primary Examiner—William H. Beha, Jr.

[57] ABSTRACT

In convertor equipment which includes a plurality of convertor bridges connected in parallel on the AC side, the AC terminals of all the convertors are connected to the same AC source. Each convertor bridge is an unsymmetrical semi-controlled bridge, composed of two controllable and two non-controllable rectifiers. The bridges have their DC terminals connected to a common load, such as an armature of a DC motor. The AC terminals of the bridges are connected to the secondary winding of a transformer, the primary winding of which is connected to a feeding AC network. Fuses for protecting the rectifiers against overcurrents are provided in the AC leads which are connected to the connecting points between the two branches of each bridge which contains non-controllable rectifiers.

1 Claim, 2 Drawing Figures

CONVERTOR EQUIPMENT COMPRISING A PLURALITY OF SINGLE-PHASE CONVERTOR BRIDGES

BACKGROUND OF THE INVENTION

1. Field of the Invention

The present invention relates to convertor equipment which comprises a plurality of convertor bridges connected in parallel on the AC side, the AC terminals of said convertor bridges being connected to the same AC source. Each convertor bridge is of the type, known per se, which is usually called an unsymmetrical semi-controlled bridge. In a known parallel-connetion of two such known bridges, the bridges have their DC terminals connected to a common load, such as the armature of a DC motor. The AC terminals of the bridges are connected to the secondary winding of a transformer, the primary winding of which is connected to a feeding AC network.

2. The Prior Art

Such a bridge has two thyristors and two diodes. The definition of an unsymmetrical semi-controlled single-phase bridge is that it has two branches comprising controllable rectifiers and two branches comprising non-controllable rectifiers. The two branches comprising controllable rectifiers are connected in series with each other between the DC terminals of the bridge, and this is also the case with the two branches comprising non-controllable rectifiers. The first bridge is connected in this manner. This type of bridge is economically very advantageous for such applications where feed-back of energy from the DC to the AC network is not required and it is common, for instance, in electrical railway operation.

The second bridge is connected in the same manner as the first bridge and includes the thyristors and also the diodes.

In conventional convertors a fuse is connected directly in series with each rectifier according to normal practice, and at least in series with each controllable rectifier. One of the most important functions of the fuses is to protect the rectifiers from being destroyed by the sudden overcurrent which occurs if one of the rectifiers loses its reverse blocking capacity.

In such a bridge the fuses are arranged in series with the two thyristors in this conventional manner. If a diode loses its blocking capacity during, for example, the half-period of the feeding voltage when its thyristor and the other diode are conducting, a short-circuit current will flow from the transformer, through such thyristor in the forward direction, through the first diode in the reverse direction and back to the transformer. One of the fuses melts and breaks the short-circuit current before the thyristor is destroyed. The same will happen if the other thyristor loses its blocking capacity during the same half-period. The other fuse then melts and breaks the short-circuit current flowing through the first diode.

However, it has proved difficult or impossible to protect effectively in this way very high power thyristors (with rated currents exceeding a few hundred amperes). Any given fuse has a certain "breaking integral" $\int i^2 dt$ during the breaking procedure). A fuse which is dimensioned to withstand the maximum load current of a high-power thyristor will have such a great breaking integral that the thyristor is destroyed upon a sudden over-current before the fuse has time to break the current.

SUMMARY OF THE INVENTION

The object of the invention is to solve this problem in the type of convertor equipment referred to here.

According to the invention, instead of having fuses in series with the thyristors in the controllable branch of each of the bridges, the fuses are arranged in the AC leads which are connected to the connecting points between the two non-controllable rectifiers in each branch of the bridge which contains such rectifiers.

BRIEF DESCRIPTION OF THE DRAWINGS

The invention will now be described with reference to the accompanying FIGS. 1 – 2.

DESCRIPTION OF THE PREFERRED EMBODIMENT

Figure 1:
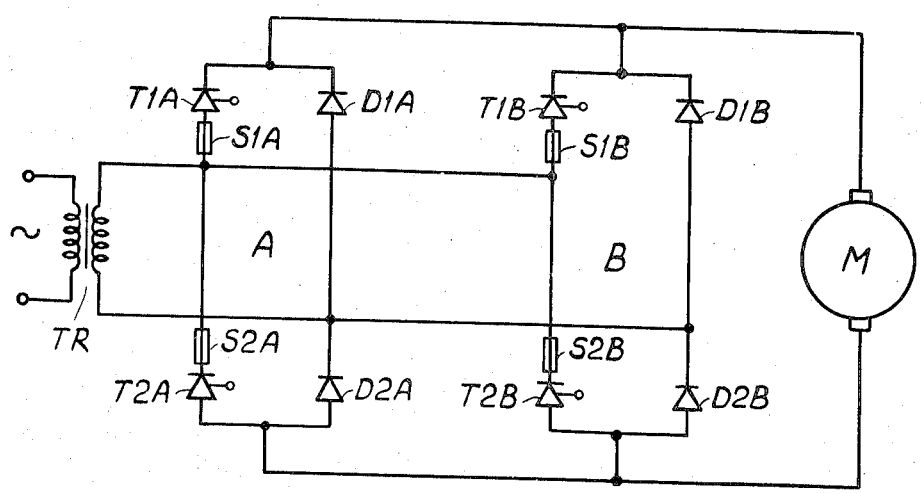
FIG. 1 shows previously known convertor equipment.

Referring now to FIG. 1, the equipment described above as prior art includes a first bridge A with two thyristors T1A and T2A and two diodes D1A and D2A, the controllable rectifiers being connected in series with each other between the DC terminals of the bridge as are the non-controllable rectifiers. This is also true of the second bridge B, which contains the controllable rectifiers T1B and T2B and the non-controllable rectifiers or diodes D1B and D2B.

In these, as shown in the drawing, the fuses S1A and S2A are arranged in series with the two thyristors in the branches containing the thyristors. As is explained above, if diode D1A loses its blocking capacity during, for example, the half-period of the feeding voltage when T1A and D2A are conducting, a short-circuit current will flow from the transformer TR through T1A in the forward direction, through D1A in the reverse direction and back to the transformer.

The fuses referred to above are indicated at S1A, S1B, S2A, and S2B. In the circumstances just described, the fuse S1A will melt and break the short-circuit current before T1A is destroyed. The same thing will happen if T2A loses its blocking capacity during the same half-period, in which event S2A will melt and break the short-circuit current flowing through D2A.

The load may be for example the armature M of a DC motor.

Figure 2:
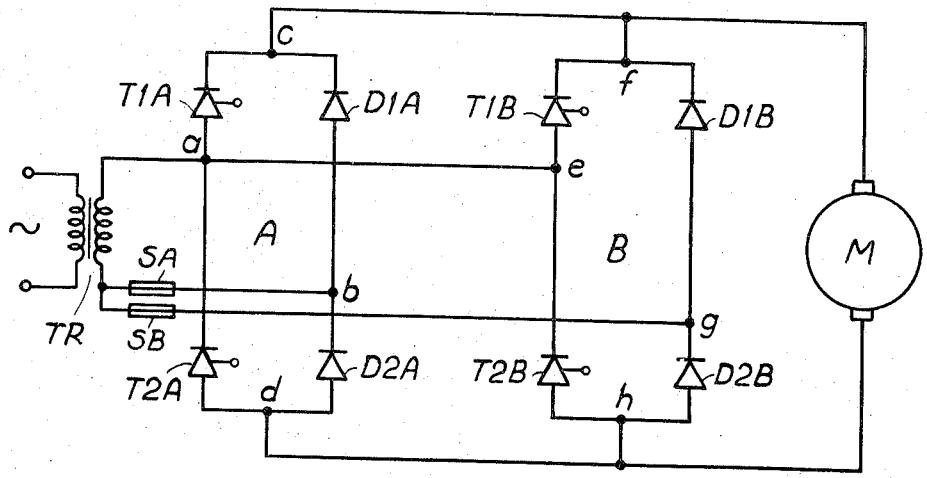
FIG. 2 shows convertor equipment according to the invention.

The equipment of FIG. 2 differs from the one shown in FIG. 1 only with regard to the position of the fuse. Thus the bridge A has only one fuse SA, arranged in the AC lead which is connected to the connecting point b between the two branches comprising diodes D1A and D2A of the bridge. The bridge B has the fuse SB, arranged in a corresponding manner. As will be shown below, this fuse arrangement, which is new with this convertor connection, presents great and unexpected advantages.

During the half-period of the alternating voltage when point a in FIG. 2 is positive in relation to point b, T1A and D2A are conducting and a reverse voltage is applied across D1A and T2A. If a fault occurs in D1A, for example, so that this diode loses its reverse blocking capacity, a short-circuit current will flow from the transformer through a, T1A, c, D1A, b and back to the transformer. However, the current also flows from a, through e, T1B, f, c, D1A, and b. Of the short-circuit current flowing through the fuse SA, half of it (in case of uniform current division) flows at each moment through T1A and half through T1B. Provided that the resistance in the thyristors is constant, the amount of energy developed in each thyristor will only be one-fourth of the amount of energy which would have been developed in T1A if the same fuse had been connected directly in series with the thyristor in the previously conventional manner.

Now, first of all the condition regarding a constant resistance is not exactly applicable to a semiconductor component, and, secondly, SA must have a somewhat greater rated current (about $\sqrt{2}$ times greater) than S1A and S2A in FIG. 1.

In spite of this, however, the final result will be a very considerable reduction of the energy developed during an overcurrent operation in each thyristor. This makes it possible for the first time effectively to protect even very large thyristors by means of fuses.

The positioning of the fuse according to the invention can of course be used for a larger number of parallel-connected bridges, and the favorable effect will then be correspondingly increased.

In the event a thyristor (say T2A) loses its reverse blocking capacity, the energy developed in the operation in the corresponding diode (D2A) will be somewhat greater in FIG. 2 than in FIG. 1. In the present type of bridges, however, the diodes are generally dimensioned for a considerably higher rated current than the thyristors, in a typical case for approximately twice the rated current. Furthermore, a diode withstands higher instantaneous short-circuit currents than a thyristor for the same rated current. The apparent disadvantage just mentioned in the device according to the invention has therefore no practical importance, and both the diodes and the thyristors will be effectively protected by the fuses.

The number of fuses in FIG. 2 is only half of the number in the known system according to FIG. 1. This involves a considerable reduction of cost despite the fact that the rated current of each fuse will be somewhat higher.

I claim:

1. Convertor equipment comprising a plurality of single-phase convertor bridges connected in parallel on their DC sides, and having DC terminals and having AC terminals connected to a common AC voltage source for the bridges, each bridge comprising two controllable and two non-controllable rectifier branches, in which the two controllable rectifier branches are connected in series with each other between the DC terminals of the bridge and the two non-controllable rectifier branches are connected in series with each other between the DC terminals of the bridge, said equipment comprising fuses for protecting the rectifiers against over-currents, in which each bridge is provided with a fuse arranged in the AC lead which is connected to the connecting point between the two non-controllable rectifier branches of the bridge.

* * * * *